US011376680B2

(12) United States Patent
Schieke et al.

(10) Patent No.: US 11,376,680 B2
(45) Date of Patent: Jul. 5, 2022

(54) METHOD FOR CHIPPING PRODUCTION OF A GEAR WHEEL PROVIDED WITH DOUBLE-HELICAL TEETH

(71) Applicant: Präwema Antriebstechnik GmbH, Eschwege/Werra (DE)

(72) Inventors: Jörg Schieke, Erfurt-Marbach (DE); Walter Holderbein, Eschwege (DE)

(73) Assignee: Präwema Antriebstechnik GmbH, Eschwege/Werra (DE)

( * ) Notice: Subject to any disclaimer, the term of this patent is extended or adjusted under 35 U.S.C. 154(b) by 48 days.

(21) Appl. No.: 16/683,777

(22) Filed: Nov. 14, 2019

(65) Prior Publication Data

US 2020/0147705 A1    May 14, 2020

(30) Foreign Application Priority Data

Nov. 14, 2018 (DE) ...................... 10 2018 128 556.6

(51) Int. Cl.
*B23F 7/00* (2006.01)
*B23F 5/20* (2006.01)

(52) U.S. Cl.
CPC . *B23F 5/20* (2013.01); *B23F 7/00* (2013.01)

(58) Field of Classification Search
CPC .... B23F 5/20; B23F 5/202; B23F 5/22; B23F 1/06; B23F 7/00; B23F 9/082; B23F 17/001
See application file for complete search history.

(56) References Cited

U.S. PATENT DOCUMENTS

| 2,873,652 A | 2/1959 | Gates et al. |
| 6,283,686 B1 * | 9/2001 | Gill ........................... B23F 7/00 |
| | | 279/136 |
| 2012/0114441 A1 | 5/2012 | Neumaier et al. |
| 2017/0157690 A1 | 6/2017 | Bittner |

FOREIGN PATENT DOCUMENTS

| CA | 971650 | 7/1975 |
| CN | 107649847 A | 2/2018 |
| DE | 102010041489 A1 | 3/2012 |
| GB | 23785 | 12/1914 |
| GB | 23785 | 5/1915 |
| GB | 544323 | 4/1942 |
| WO | 2012010165 A2 | 1/2012 |

* cited by examiner

*Primary Examiner* — Christopher J Besler
(74) *Attorney, Agent, or Firm* — The Webb Law Firm

(57) ABSTRACT

The invention makes available a method for the production of gear wheels, with which it is possible to produce gear wheels having double-helical teeth, in particularly efficient manner. For this purpose, in the case of the method according to the invention for chipping production of a gear wheel, which is provided with double-helical teeth, in which the teeth of the one gear half are configured to run counter to the teeth of the other gear half, in rising manner, wherein the gear halves are arranged offset from one another by an angle amount with reference to the axis of rotation of the gear wheel, a gear wheel blank is made available, on which the teeth provided on the gear wheel are produced by means of hobbing, using a hobbing wheel, which, during hobbing machining of the teeth, in each instance, of one of the gear halves, reaches all the way into the adjacent tooth gaps of the other gear half, in each instance.

5 Claims, 2 Drawing Sheets

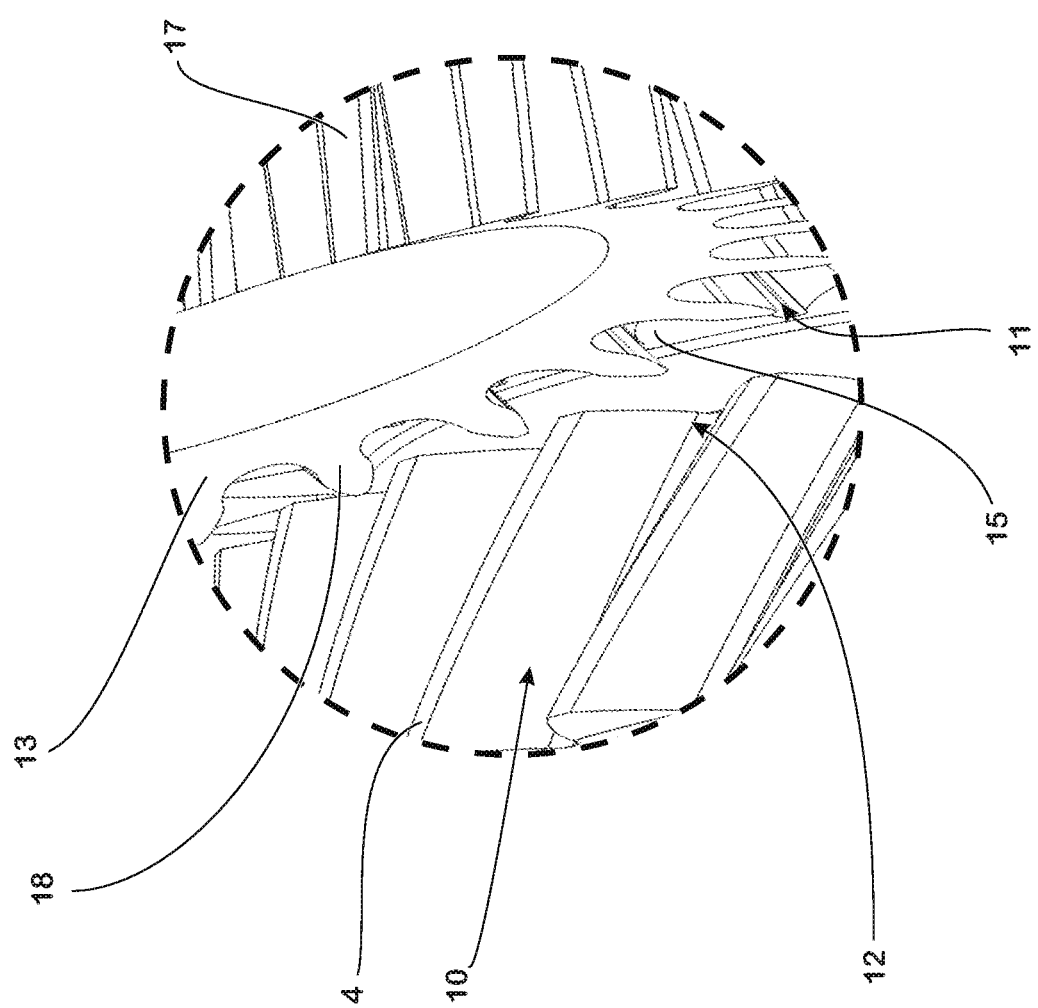

METHOD FOR CHIPPING PRODUCTION OF A GEAR WHEEL PROVIDED WITH DOUBLE-HELICAL TEETH

CROSS-REFERENCE TO RELATED APPLICATION

This application claims priority to German Patent Application No. 10 2018 128 556.6 filed Nov. 14, 2018, the disclosure of which is hereby incorporated by reference in its entirety.

BACKGROUND OF THE INVENTION

Field of the Invention

The invention relates to a method for chipping production of a gear wheel that is provided with double-helical teeth, in which the teeth of the one gear half are configured to run counter to the teeth of the other gear half, in rising manner, wherein the gear halves are arranged offset from one another by an angle amount with reference to the axis of rotation of the gear wheel.

In this manner, in the case of a gear wheel to be machined according to the invention, the teeth of the one gear half overlap with the tooth gaps adjacent to them, which are present between the other gear half, in each instance, in the case of a projection in a plane oriented normal to the axis of rotation of the gear wheel.

The double-helical teeth present on a gear wheel according to the invention are also referred to as "arrow teeth" by persons skilled in the art because of the roof surfaces of their teeth, which run acutely toward one another. In this regard, a distinction is made between "true" arrow teeth, in which the teeth of the gear that run acutely toward one another meet in V shape, and those gears in which a certain distance is present between the ends of the teeth of the gear halves that are assigned to one another.

Description of Related Art

A gear wheel provided with such a gear is described, for example, in the publication GB 191423785 of a British patent application. The possibility described there, of the production of such gear wheels by means of milling, has established itself as a standard, in the meantime, in the production of gear wheels produced in one piece and having arrow teeth.

A particular challenge in the chipping production of gear wheels having true arrow teeth results from the fact that in general, too little room is available for the chipping tool in the region in which the teeth of the gear halves that are oriented to run counter to one another, in rising manner, meet one another, so as to machine the respective tooth all the way to the point where the teeth meet, called the "apex point."

In practice, this problem is countered in that a groove that runs circumferentially is formed into the gear wheel between the gear halves, so that a free distance is present between the gear halves, the width of which groove is sufficient to hold the tool that is moved beyond the end of the tooth assigned to the groove. However, for this purpose widening of the gear wheel that corresponds to the width of the groove must be accepted.

It is already evident from GB 191423785, in this regard, that this unavoidable widening can be reduced in that for simplified production of the teeth of a double-helical gear by means of milling, the gear halves can not only be arranged at a specific axial distance from one another, but also offset from one another by a specific angle amount with reference to the axis of rotation of the gear wheel, in such a manner that the ends of the teeth of the first gear half assigned to a gear half are disposed centered, in each instance, with reference to a tooth gap of the second gear half adjacent to them. In this manner, the milling tool used according to GB 191423785 can be moved, during machining of the tooth of the first gear half, along its first tooth flank, all the way into the free space that is formed by the end region of the assigned tooth gap of the second gear half. Subsequently, the milling tool is moved further along the end face of the machined tooth that is assigned to the tooth gap in question, making use of this free space, so as to thereupon mill the other tooth flank of the tooth being machined, in each instance.

SUMMARY OF THE INVENTION

Against the background of the state of the art as explained above, the task has arisen of indicating a method for the production of gear wheels, with which gear wheels of the type explained above can be produced in particularly efficient manner.

The invention has accomplished this task in that during production of a gear wheel with double-helical teeth, the method steps indicated in claim 1 are completed. In this regard, it is understood, obviously, that in practice, not only these work steps that are prescribed according to the invention but all other work steps that are completed in the production of gear wheels of the type in question here will be carried out if the need for this arises.

The invention therefore provides, for the production of a gear wheel that is provided with double-helical teeth, in which the teeth of the one gear half are configured to run counter to the teeth of the other gear half, in rising manner, wherein the gear halves are arranged offset from one another by an angle amount with reference to the axis of rotation of the gear wheel, that a gear wheel blank is made available, on which the teeth provided on the gear wheel are produced by means of hobbing by means of a hobbing wheel, which, during the hobbing machining of the teeth of one of the gear halves, in each instance, reaches all the way into the adjacent tooth gaps of the other gear half.

The enhanced hobbing, also known as skiving or hob peeling, used according to the invention for the production of a gear wheel provided with double teeth is a continuous chipping method, in which roll milling and ramming by means of continuous turning are combined with axial advancing. Particular efficiency of skiving or hob peeling, results from this, and makes it possible to produce gear wheels in a clearly reduced machining time. In this regard, the slanted arrangement of the axes of tool and workpiece are characteristic for skiving or hob peeling, on the basis of which arrangement the axes of rotation of tool and workpiece intersect in what is called an axis intersection angle. By means of the crossing axis arrangement, a relative speed occurs between tool and workpiece. This relative motion is utilized as a cutting movement, the main cutting direction of which is oriented along the tooth gap of the workpiece. The value of the cutting speed is dependent on the value of the axis intersection angle and on the speed of rotation of the machining spindles (see brochure "Hobbing—Power Skiving", edition 08/2014, published by the applicant and made available for download under the URL "http://praewema.dvs gruppe.com/uploads/tx_xpctypedownloadssimple/PRW_Power_Skiving.pdf").

Surprisingly, it has now been shown that so much room can be made available by means of an offset of its gear halves, even in the case of a gear wheel having double-helical teeth, in the region of the ends of the teeth of the gear halves that are assigned to one another, in the region of the tooth gap that lies opposite the machined tooth, in each instance, so that a hobbing tool used for hobbing machining can move all the way into this space and thereby can completely machine the teeth of the one gear half in question, without colliding with one of the teeth of the other gear half, in each instance.

In this regard, it proves to be particular advantageous that the offset of the gear halves of a gear wheel having double-helical teeth not only allows use of hobbing at a minimized width of the workpiece to be machined, but also allows an enlarged axis intersection angle, and thereby the hobbing machining carried out according to the invention becomes particularly effective.

The method according to the invention can be used in particularly effective manner in the case of the production of gear wheels in which the double-helical teeth to be formed are outer teeth. Likewise, however, it is also possible to produce double inner teeth in the manner according to the invention.

It is important for the invention that the blank made available according to the invention makes the material available into which cutting takes place during hobbing. For this purpose, the blank can be pre-shaped in known manner, from one piece, for example by means of forging or casting technology.

Alternatively to the one-piece configuration of the blank, it is also possible to compose the blank of one or more pre-finished components. It is essential, in this regard, however, that the pre-finished components are not yet provided with the finished teeth, but rather these are only produced by means of machining of the gear wheel blank according to the invention, which blank is composed of the components in question, in this case.

Depending on the geometry of the double-helical teeth to be produced on the gear wheel to be produced according to the invention, it can also be necessary for the use of hobbing according to the invention that in addition to the free space utilized in the region of the respective tooth gap, a certain distance is present between the end faces of the teeth of the gear halves of the gear wheel, which distance is available for movement of the hobbing tool. However, this distance is clearly less than the one that would be required if double teeth are supposed to be produced by means of hobbing, with gear halves that are not arranged offset relative to one another, in which the double teeth are therefore configured as arrow teeth with a circumferential groove that lies between the gear halves. In this regard, the distance that is also optionally present between the gear halves for the method according to the invention can also be produced, in simple manner, in that a circumferential groove that runs around the gear wheel is formed in between the gear halves before the hobbing machining.

The size of the free space utilized according to the invention in the region of the tooth gaps of the one gear half during machining of the teeth of the other gear half, in each instance, can be optimized by means of suitable adjustment of the angle offset between the gear halves. For this purpose, an angle amount by which the gear halves are arranged offset relative to one another, which corresponds to half the tooth spacing of the gear halves, has proven to be particularly favorable.

BRIEF DESCRIPTION OF THE DRAWINGS

In the following, the invention will be explained in greater detail using a drawing that shows an exemplary embodiment. The figures schematically show, in each instance:

FIG. 2 an enlarged detail A of FIG. 1.

DESCRIPTION OF THE INVENTION

Figure 1:
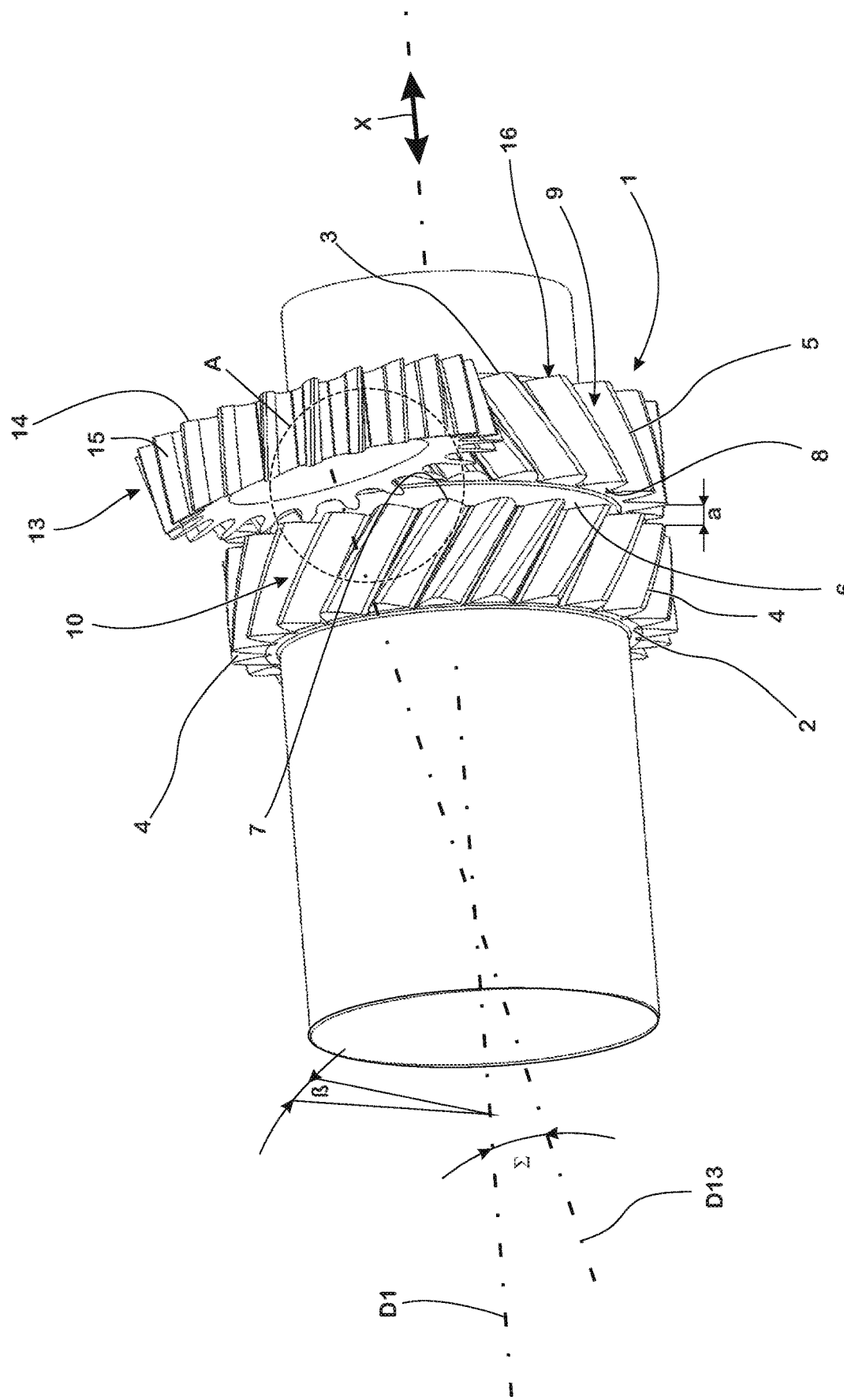
FIG. 1 a gear wheel with double teeth, during hobbing machining by means of a hobbing wheel, in a perspective view.

The gear wheel 1, which is pre-machined in a usual manner, has double teeth configured as outer teeth, with a left gear half 2 and a right gear half 3.

The gear halves 2, 3 each have teeth 4, 5 shaped in typical manner for double teeth, which are oriented radially relative to one another in opposite rising manner, in such a manner that seen in a side view of the gear wheel 1, they run acutely toward one another in the manner of a "A."

In this regard, a circumferential groove 6 is formed in between the gear halves 2, 3 of the gear wheel 1 formed in one piece, so that the end faces of the teeth 4, 5 that are present at the ends 7, 8 of the teeth 4, 5 of the gear halves 2, 3 are disposed at an axial distance a from one another.

At the same time, the left gear half 2 is oriented offset by an angle amount $\beta$ with reference to the axis of rotation D1, relative to the right gear half 3, which amount corresponds to half the spacing of the teeth of the gear halves 2, 3.

In this manner, the teeth 4 of the left gear half 2 overlap the tooth gaps 9 adjacent to them in the case of a projection in a plane oriented normal to the axis of rotation D1 of the gear wheel 1, in the case of the gear wheel 1 to be machined; one tooth gap is present, in each instance, between two adjacent teeth 5 of the right gear half 3.

Therefore every tooth 4 of the left gear half 2 has one of the tooth gaps 9 that are present between two teeth 5 of the right gear half 3, in each instance, assigned to it. Likewise, in a corresponding manner, each tooth 5 of the right gear half 3 has one of the tooth gaps 10 delimited by two teeth 4 of the left gear half 2, in each instance, assigned to it, so that every end 7, 8 of the teeth 4, 5 of the gear halves 2, 3 has an end region 11, 12 of the tooth gaps 9, 10 of the respectively other gear half 3, 2 lying opposite it.

In the case of the example shown here, of finish-machining of the teeth 5 of the right gear half 3, a conventionally configured hobbing wheel 13 is used, on the circumference of which the gear 14 with teeth 15 to be formed on the gear half 3 is marked. During hobbing machining, the hobbing wheel 13 continuously rotates about an axis of rotation D13, which is disposed at a slant with reference to the axis of rotation D1 of the gear wheel 1, which is also driven to rotate continuously during hobbing machining, as a workpiece, in such a manner that the axes of rotation D13, D1 intersect at an axis intersection angle $\Sigma$. At the same time, hobbing wheel 13 and gear wheel 1 are moved relative to one another in the axis direction X, parallel to the axis of rotation D1.

Thus, the gear wheel 1 is moved along the hobbing wheel 13 with its tooth flank 17, which is machined in chipping manner by means of hobbing, in each instance, proceeding from the end face 16 that faces away from the left gear half 2, of the teeth 5 of the right gear half 3 that are being machined.

This movement is continued until at least one of the teeth 15 of the hobbing wheel 13 that are in engagement with the machined teeth 5, in each instance, has run beyond the distance a formed by the groove 6 with its end face 18 all the way into the end region 12 of the tooth gaps 10 of the left gear half 2 assigned to the machined teeth 5, which region borders on the groove 6.

In this manner, the tooth flanks 17 of the teeth 5 of the right gear half 3 can be finish-machined, without collisions of the teeth 15 of the hobbing wheel 13 with the teeth 4 of the left gear half coming about, although the distance a formed by the groove 6, of the ends 7, 8 of the teeth 4, 5 of the gear halves 2, 3 which are assigned to one another is smaller than the distance that is required, taking into consideration the slanted orientation of the axes of rotation D1, D13, so as to machine the teeth 5 of the right gear half 3 over the entire length of their tooth flanks 17, measured in the direction of the axis of rotation D1, with the teeth 15 of the hobbing wheel 13.

In a corresponding manner, the tooth flanks of the teeth 4 of the left gear half 2 are then finish-machined, utilizing the [word/words appear to be missing] in the end regions 11 of the tooth gaps 9 of the right gear half 3, making use of a hobbing wheel adapted for this machining task. Alternatively, it is also possible to make use of the hobbing wheel 13 for this purpose after a corresponding alignment.

REFERENCE SYMBOLS 1 gear wheel (workpiece)
2 left gear half of the gear wheel 1
3 right gear half of the gear wheel 1
4 teeth of the left gear half 2
5 teeth of the right gear half 3
6 circumferential groove
7 end of the teeth 4 of the gear half 2
8 end of the teeth 5 of the gear half 3
9 tooth gaps of the gear half 3
10 tooth gaps of the gear half 2
11 end region of the tooth gaps 9
12 end region of the tooth gaps 10
13 hobbing wheel (tool)
14 gearing of the hobbing wheel 13
15 teeth of the gearing 14
16 end face of the tooth 5 of the right gear half 3 to be machined, in each instance, facing away from the left gear half
17 tooth flank of the machined tooth 5, in each instance
18 end face of the teeth 15 of the hobbing wheel 13
a axial distance of the end face of the teeth 4, 5 that are assigned to one another
β angle amount (angle offset)
D1 axis of rotation D1 of the gear wheel 1
D13 axis of rotation of the hobbing wheel 13
Σ axis intersection angle
X axis direction parallel to the axis of rotation D1

The invention claimed is:

1. A method for chipping production of a gear wheel, which is provided with double-helical teeth, the gear wheel having two opposing gear halves each having teeth, between every two teeth of the teeth of the gear halves is a tooth gap, the teeth of one gear half of the gear halves being configured to run counter to the teeth of the other gear half of the gear halves, in rising manner, wherein the gear halves are arranged offset from one another by an angle amount with reference to an axis of rotation of the gear wheel, so that one tooth gap of the tooth gaps of one gear half of the gear halves is arranged adjacent to one tooth of the teeth of the other gear half of the gear halves, wherein a gear wheel blank is provided, on which the teeth provided on the gear wheel are produced by means of hobbing using a hobbing wheel, which, during the hobbing machining, the hobbing wheel continuously rotates about an axis of rotation, which is disposed at a slant with reference to the axis of rotation of the gear wheel so that the axis of rotation of the hobbing wheel intersects the axis of rotation of the gear wheel at an axis intersection angle, wherein at the same time the hobbing wheel and the gear wheel are moved relative to one another in an axis direction aligned parallel to the axis of rotation of the gear wheel, and wherein, during the hobbing machining of the teeth of one gear half of the gear halves, the hobbing wheel reaches all the way into a first tooth gap of the tooth gaps of the other gear half, wherein the first tooth gap is arranged adjacent to the tooth being hobbed.

2. The method according to claim 1, characterized in that the double-helical teeth to be formed on the gear wheel are outer teeth.

3. The method according to claim 1, characterized in that the double-helical teeth to be formed on the gear wheel are inner teeth.

4. The method according to claim 1, characterized in that a groove that runs circumferentially around the gear wheel is molded in between the gear halves before the hobbing machining.

5. The method according to claim 1, characterized in that the angle amount by which the gear halves are arranged offset from one another corresponds to half of a width of the tooth gaps of the gear halves.

* * * * *